(12) United States Patent
Charlet et al.

(10) Patent No.: US 7,027,214 B2
(45) Date of Patent: Apr. 11, 2006

(54) ON FIELD UPGRADE OF A FLAT OUTPUT OPTICAL TRANSMISSION SYSTEM

(75) Inventors: Gabriel Charlet, Villiers-le-Bacle (FR); Christian Simonneau, Antony (FR)

(73) Assignee: Alcatel, Paris (FR)

( * ) Notice: Subject to any disclaimer, the term of this patent is extended or adjusted under 35 U.S.C. 154(b) by 81 days.

(21) Appl. No.: 10/752,677

(22) Filed: Jan. 8, 2004

(65) Prior Publication Data
US 2004/0141227 A1 Jul. 22, 2004

(30) Foreign Application Priority Data
Jan. 13, 2003 (EP) .................... 03360007

(51) Int. Cl.
*H01S 3/00* (2006.01)
*H04B 10/12* (2006.01)
(52) U.S. Cl. .................... 359/334; 359/337.1
(58) Field of Classification Search ............. 357/337.4, 357/337.1
See application file for complete search history.

(56) References Cited

U.S. PATENT DOCUMENTS

| 6,275,329 B1 | 8/2001 | Sieben |
| 6,456,427 B1 * | 9/2002 | Chen et al. ............... 359/337.1 |
| 6,646,788 B1 * | 11/2003 | Islam et al. .................. 359/334 |

FOREIGN PATENT DOCUMENTS

| EP | 0 782 225 A2 | 7/1997 |
| JP | 02001024592 A * | 1/2001 |
| WO | WO 02/41535 A2 | 5/2002 |

OTHER PUBLICATIONS

H. Masuda et al, "Ultra-wideband hybrid amplifier comprising distributed Raman amplifier and erbium-doped fibre amplifier", Electronics Letters, IEE Stevenage, GB, vol. 34, No. 13, Jun. 25, 1998, pp. 1342-1344 XP006009974.

H. Bissessur et al, "3.2 Tbit/ s(8040&emsp 14; Gbit/s) phase-shaped binary transmission over 3100  km with 0.8&emsp 14;bit/Hz efficiency", Electronics Letters, IEE Stevenage, GB, vol. 38, No. 8, Apr. 11, 2002, pp. 377-379, XP006018200.

* cited by examiner

*Primary Examiner*—Mark Hellner
(74) *Attorney, Agent, or Firm*—Sughrue Mion, PLLC

(57) ABSTRACT

An Optical transmission system (10) is presented that comprises at least one transmitter (12), at least one transmission line (14), at least one optical fiber amplifier (18), and at least one receiver (21), the optical fiber amplifier (18) being designed to show a flat characteristic of output power versus wavelength. The optical fiber amplifier (18) is designed to show the flat output characteristic in response to a flat characteristic of a first input power level versus wavelength. At least one coupler (28) for coupling at least one Raman amplifier (30) to the optical transmission system (10) is provided, the Raman amplifier (30) having a Raman gain that is tilted in a direction opposite to a tilt of the optical fiber amplifier (18) that would occur in response to a flat characteristic of a second input power level versus wavelength. Thereby, an optical transmission system (10) is presented that can be upgraded to improve OSNR while maintaining a flat output characteristic.

14 Claims, 2 Drawing Sheets

ON FIELD UPGRADE OF A FLAT OUTPUT OPTICAL TRANSMISSION SYSTEM

BACKGROUND OF THE INVENTION

The invention is based on a priority application EP03360007.3 which is hereby incorporated by reference.

The present invention relates to an optical transmission system comprising at least one transmitter, at least one transmission line, at least one optical fiber amplifier, and at least one receiver, the optical fiber amplifier being designed to show a flat characteristic of output power versus wavelength.

Such optical transmission systems are per se known.

In general, gain tilt is the measure of the slope of the wavelength dependent gain of a fiber amplifier (EP 782 225).

It is possible to install an optical transmission system such like a Wavelength Division Multiplexing(WDM) system only with erbium doped fiber amplifiers (EDFA) as amplifying components.

Modern EDFA are two stage amplifiers with mid-stage access for dispersion compensation (with Dispersion Compensating Fiber) or Optical Add and Drop Multiplexer (OADM). A mid-stage Variable Optical Attenuator is used to control the tilt of the EDFA. We can consider the following EDFA:

P_in=−5 dBm, P_out_1_stage=14 dBm,
P_in_2_stage=5 dBm, P_out_2_stage=20 dBm

A large number of EDFA are available on the market. Hence, the above values should rather be understood as exemplary than be understood as limiting the present invention's area of application.

Of course, a certain optical signal to noise ratio (OSNR) has to be achieved at the end of the transmission line.

State of the art systems utilising erbium doped fiber amplifiers are usually designed to have a flat overall output spectrum.

However, it is not easy to predict the performance of a terrestrial system with good accuracy before installation. Therefore, a system that has been designed to have a flat output may, after installation, not achieve the desired optical signal to noise ratio. Further, the characteristics of an installed system may deteriorate due to ageing or due to repair of the fiber during operation.

Accordingly, the transmission line may suffer from optical signal to noise ratio degradation. Even further, OSNR degradation may be caused after a first installation of the system by increasing the number of channels of the system.

It is, therefore, desirable to have a certain OSNR margin in the system that may compensate for the above mentioned degradation. An OSNR margin is understood as a margin, or distance between the target OSNR at the end of the transmission system and the OSNR needed in back to back to have an admissible BER.

In general, the Bit Error Rate (BER) of the system has to be better than $10^{-13}$. In order to achieve this performance, Forward Error Correction (FEC) is used. With a BER of $10^{-13}$ before correction, a BER that is better than $10^{-13}$ is achieved after FEC. However, detrimental effects may occur that can degrade the BER. Examples of such effects are non linear effects that are caused by to much power being fed into the fiber, chromatic dispersion of the fiber, Polarization Mode Dispersion (PMD), and, as mentioned above, ageing of the line as well as losses due to repair on the transmission line.

The impact of these effects is measured as an OSNR penalty. For example, we can consider that an OSNR improvement of 1 dB is needed to compensate for dispersion problems, 1 dB for PMD-compensation, 1 dB for compensating non linear effects, 2 dB for ageing and repair, and so on. In back to back, an OSNR of 12 dB/0.1 nm is needed to achieve a BER of $10^{-3}$. To guarantee, after transmission, a BER of $10^{-3}$, an OSNR of 12+5 dB=17 dB/0.1 nm may be needed. In this particular case, the margin would be 5 dB.

If this OSNR margin is not achieved at the end of the transmission system, the OSNR can be improved by improving the Noise Figure (NF) of some optical amplifiers. The Noise figure of Raman amplifier (typically NF=0 dB) is better than that of EDFA (typically NF=5 to 6 dB).

The NF of a Raman amplifier with NF1 and G1 and a subsequent EDFA with NF2 is NF1+NF2/G1 (NF1, NF2 and G1 are expressed in linear).

However, Raman amplifiers are expensive and should therefore only be installed when necessary.

Accordingly, it is desirable to have the opportunity to install a Raman amplifier after a first installation of the system. Such a supplementary installation should be possible in connection with a first installation of the system, when the system does not achieve the desired performance. It should, further, be possible to add Raman amplification after years of operation. However, such a supplementary installation has, prima facie, certain drawbacks.

First of all, the desired characteristics of an optical transmission system such as a WDM system should be conserved when further amplification is added. As already mentioned, the desired characteristics include a flat system output. If a system is designed to include a Raman amplifier, a flat system output is usually achieved by combining a Raman amplifier with flat gain characteristics with an EDFA, the Raman amplifier and the EDFA being designed to have a flat output spectrum when combined with each other. However, EDFA with high input powers (due to Raman preamplification) require a specific EDFA design. As a result, a particular EDFA is designed to provide one particular flat output power when fed with one particular flat input power.

If the input power is changed, for instance by incorporating an additional Raman amplifier, the output power of the system will be tilted, even if the additional Raman amplifier provides a flat input to the EDFA. A tilted output means for example, that channels allocated to longer wavelengths will have more power than channels allocated to shorter wavelengths.

It is known in the art, e.g. from U.S. Pat. No. 6,275,329, to compensate for a tilted output by utilizing Variable Optical Attenuators (VOA). However, a VOA allows to keep the flatness of the EDFA output but at the expense of the OSNR.

Further, the incorporation of an additional Raman amplifier into an existing system would, prima facie, require to cut the system in order to allow for installing the additional Raman amplifier. In other words: The whole system would need to be switched off, the additional Raman amplifier, had to be put in and, the whole transmission line had to be switched on again.

SUMMARY OF THE INVENTION

It is, in view of the above an objective of the present invention to provide for an optical transmission system such as a WDM system that can be upgraded by adding further margin or, in other words, by improving the OSNR, and wherein the above mentioned drawbacks are at least reduced.

This objective is achieved by an optical transmission system as mentioned at the outset, wherein the optical fiber amplifier is designed to show the flat output characteristic in response to a flat characteristic of a first input power level versus wavelength, at least one coupler for coupling at least one Raman amplifier to the optical transmission system, the at least one Raman amplifier having a Raman gain that is tilted in a direction opposite to a tilt of the optical fiber amplifier that would occur in response to a flat characteristic of a second input power level versus wavelength.

Accordingly, margins can be added to a system, if needed, whereas the expense incurred by adding margins can be avoided if additional margins are not needed.

It is preferred that the optical fiber amplifier is an Erbium Doped Fiber Amplifier.

Erbium doped fiber amplifiers are widely known and used in the field of optical transmission systems. Accordingly, the present invention further facilitates the utilization of this transmission technology and establishes the opportunity to improve existing systems that utilize this technology.

Further, it is preferred that the coupler is a multiplexer. It is, alternatively, preferred that the coupler is a circulator. It is, further, preferred that the circulator substitutes the isolator at the input of the first stage of the EDFA. An EDFA comprises, in general, several stages of amplification.

In any case, known components may be used to realize the invention, thereby facilitating the utilization of the invention.

In any case, an addition of margin becomes possible without having to change the overall design of the system. Accordingly, a transmission system may be upgraded easily.

Further, it is preferred that the at least one Raman amplifier comprises a plurality of Raman pumps, the wavelengths and powers of which being chosen to result in a predetermined gain tilt.

It has been shown, that the desired gain tilt characteristics may easily be adapted to a particular system by utilizing in particular these physical quantities as tuning variables.

Even further, it is preferred that the Raman amplifier comprises three Raman pumps.

It has been shown, that three Raman pumps are, in most cases, sufficient to achieve the desired gain tilt.

Additionally, it is preferred that each Raman amplifier emits a certain power with a spectrum having a maximum in the wavelength range of 1400 nm to 1520 nm, each maximum referring to a different wavelength, the emitted power allocated to a spectrum with a maximum at a shorter wavelength exceeding the emitted power allocated to a spectrum with a maximum at a longer wavelength. Typically, for C-Band (1529 nm–1567 nm) amplification, the Raman pump wavelengths will be comprised between 1420 nm and 1455 nm and for L-Band (1569 nm–1605 nm), the Raman pump wavelengths will be set between 1555 nm and 1500 nm.

It is this particular combination that has been shown to provide for the desired gain tilt in cases, where the input power of the EDFA is increased due to the gain of the Raman amplifier.

Further advantages can be taken from the description and the enclosed drawings.

It is to be understood that the features mentioned above and those yet to be explained below can be used not only in the respective combinations indicated, but also in other combinations or in isolation, without leaving the scope of the present invention. It is, in particular contemplated to use the invention in any transmission bandwidth that is suitable for Raman amplification.

BRIEF DESCRIPTION OF THE DRAWINGS

Embodiments of the invention are shown in the drawings and will be explained in more detail in the description below. In the drawings:

In FIG. 1, an optical transmission system is designated in its entirety by identification reference 10. A transmitter 12 launches a sequence of optical signals onto transmission line 14. Transmission line 14 comprises an optical fiber amplifier 18, which may be an erbium doped fiber amplifier (EDFA) 18. Receiver 21 receives optical signals transmitted over transmission line 14.

Figure 1:
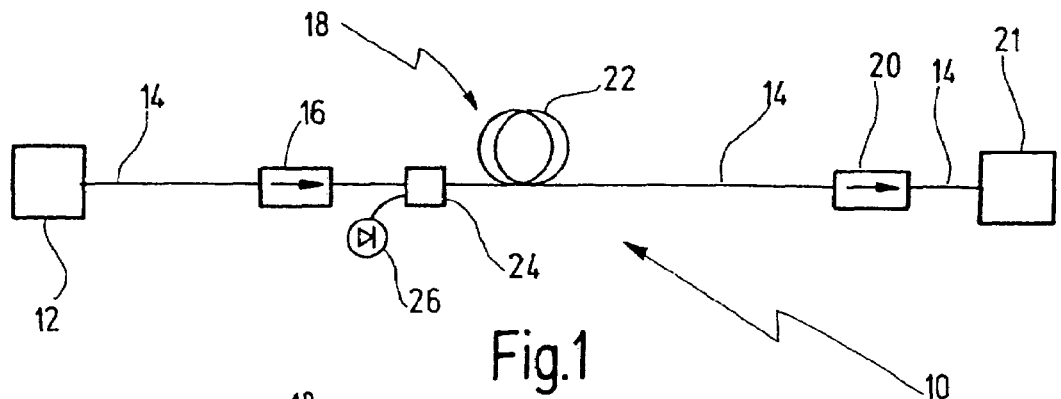
FIG. 1 shows a prior art optical transmission system.

Generally, optical fiber amplifier 18 comprises at least an optical fiber 22, a first coupler 24 and a first pump light source 26. Further, optical fiber amplifier 18 comprises an isolator 16 at the input, an isolator 20 at the output, and a filter (not shown) in order to have a flat spectrum. Optical fiber 22 may be an erbium doped fiber 22. The first pump light source 26 may be a laser diode that continuously emits pumping light of approximately 980 nm or at 1480 nm wavelength.

The pumping light is coupled into erbium doped fiber 22 via first coupler 24 that may be a conventional wavelength division multiplexer 24. In erbium doped fiber 22, energy is transferred from the pump light to the signal, resulting in signal amplification. The optical fiber amplifier 18 is designed to show a flat characteristic of output power versus wavelength of the optical signal. According to the invention, at least one coupler 28 for coupling at least one Raman amplifier 30 to optical transmission system 20 is provided.

Figure 2:
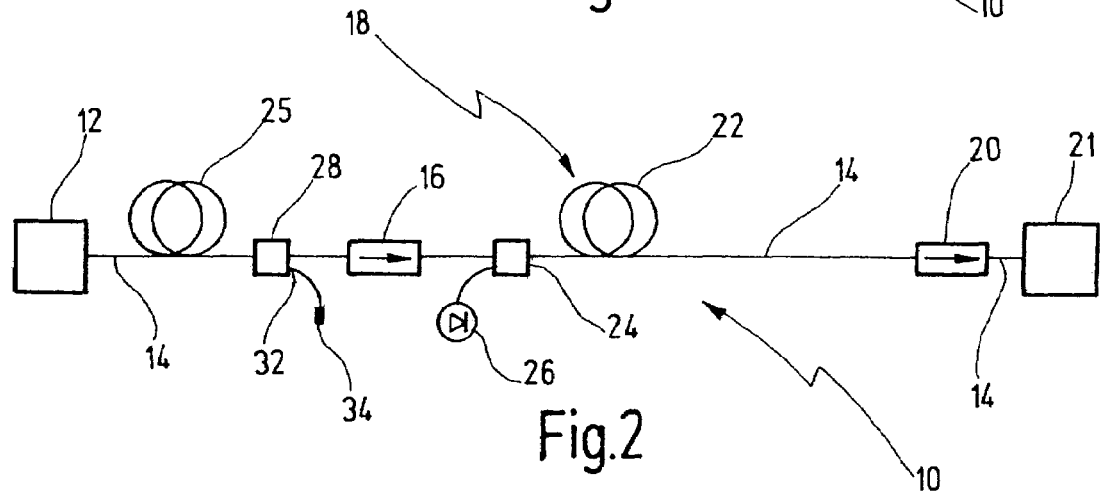
FIG. 2 shows a first embodiment of the invention in a first stage of installation.

In FIG. 2, a first embodiment of the invention in a first stage of installation is shown. In principle, the system is designed to operate without Raman amplifier 30 in a first stage of installation. In this case, terminal 32 of the at least one coupler 28 may be terminated with an optical connector 34 or even with nothing.

A Raman amplifier may be used if long span of optical fiber 25 is deployed before the amplifier, at least 20 km.

However, Raman amplifier 30 may be connected to transmission line 10 in a second stage of installation via coupler 28 in order to add optical signal to noise ratio margin (OSNR margin) by improving the NF of the amplifier.

Figure 3:
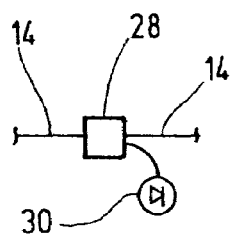
FIG. 3 shows the first embodiment in a second stage of installation.

A second stage of installation is shown in FIG. 3. Connecting the additional Raman amplifier 30 rather provides for an amplification having a low noise figure (NF) than providing simply for more amplification. The low noise figure arises from the distributed gain induced by the Raman amplifier. The second stage of installation can be established without having to cut the system 10 temporarily, i.e. without having to switch the system off and on.

Raman amplifiers are known in the field of optical transmission systems. In short, a Raman amplifier provides for pump light that is introduced along the same optical fiber that guides the optical signal. The pump light wavelength is shorter than the signal wavelength. Accordingly, pump light photon energy exceeds signal photon energy and may, therefore, be transferred to the signal by the Raman effect. Such a Raman amplification is per se known.

Figure 4:
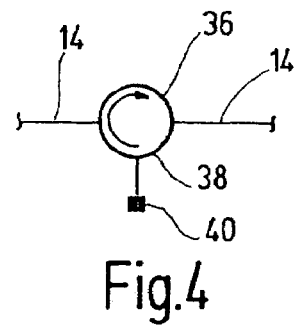
FIG. 4 shows a second embodiment of the invention in a first stage of installation.

FIG. 4 shows a second embodiment of the invention. In FIG. 4, circulator 36 provides for the coupling function of multiplexer 28 of FIG. 2, 3. Since circulator 36, in addition, also shows optical isolation properties, circulator 36 may substitute first optical isolator 16 of FIG. 2. In a first stage of installation, terminal 38 of circulator 36 is terminated by a connector 40 or even nothing.

Figure 5:
FIG. 5 shows the second embodiment in a second stage of installation.

The fiber will be spliced to the Raman amplifier when the upgrade will be done or connected if the circulator has been terminated by a connector. In a second stage of installation, as shown in FIG. 5, a Raman amplifier 30 is connected to transmission line 10 via circulator 36.

Figure 6:
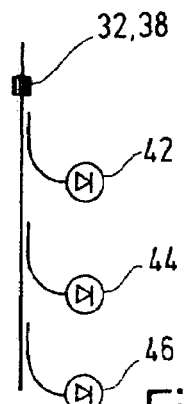
FIG. 6 shows a Raman amplifier comprising three Raman pumps.

In a preferred design, a plurality of Raman pumps is utilized for providing additional margin. This is represented by FIG. 6, which shows a Raman amplifier 30 comprising three Raman pumps 42, 44 and 46. Raman amplifier 30 is connected to terminal 32; 38 of the preceding Figures. However, it is to be understood that other numbers of Raman pumps may be utilised.

The wavelength and power of each Raman pump 42, 44, 46 are chosen such that the particular combination of wavelengths and powers keep the output of the optical fiber amplifier 18 flat and improve the noise figure of the system.

Figure 7:
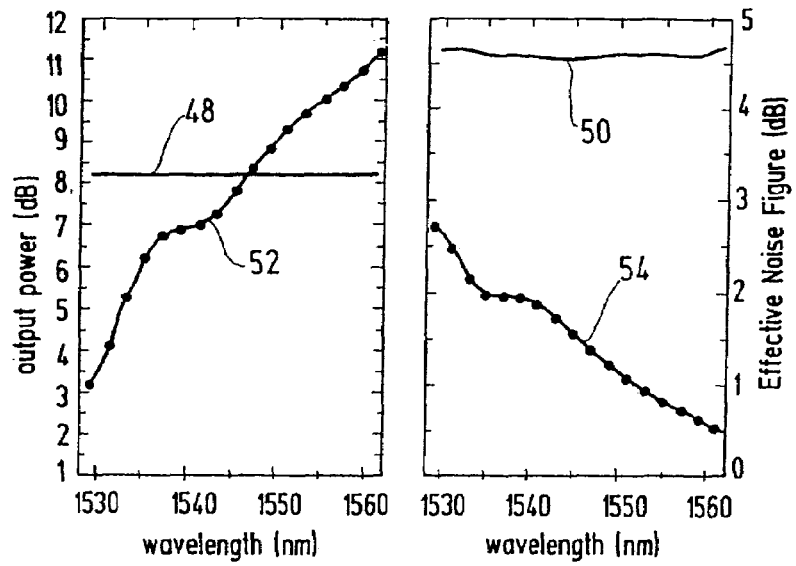
FIG. 7 shows the unwanted effect of an additional flat raman gain.
Figure 8:
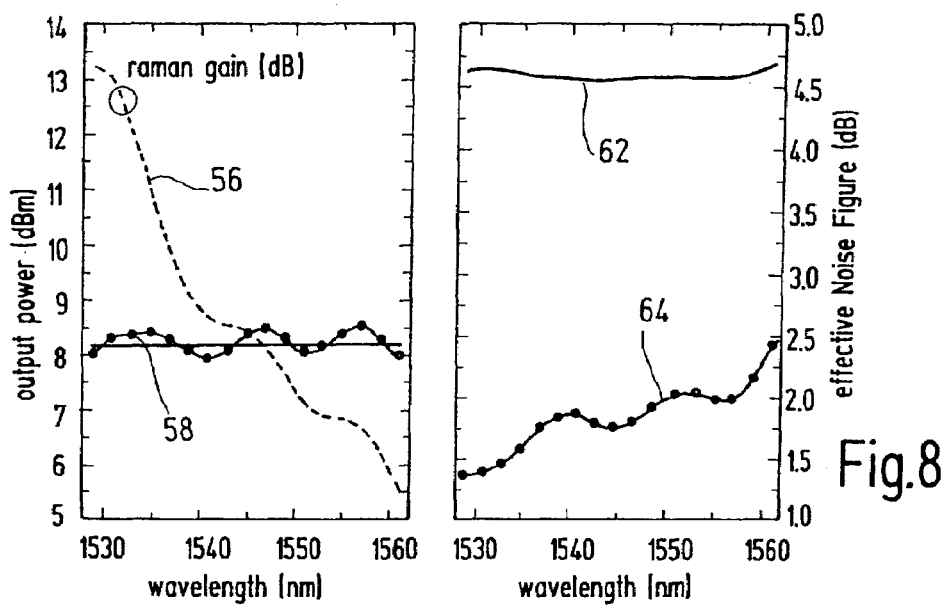
FIG. 8, 9 show examples of improvements in noise figure calculated by simulation.
Figure 9:
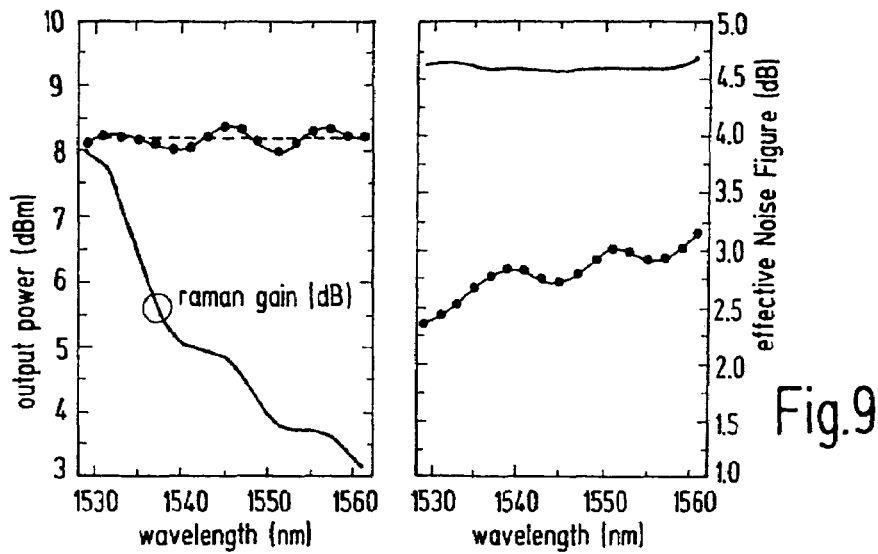

Examples of such improvements calculated by simulation are shown in FIGS. 8 and 9, while FIG. 7 shows the unwanted effect of an additional flat Raman gain.

The example has been calculated for an optical transmission system with 25 dB of span loss and an erbium doped fiber amplifier with 9 dB of mid-stage loss (P_in=–5 dBm, p_out=20.5 dBm). A span defines the length of the transmission fiber between two amplifiers. A typical value of such a span is 80 km.

In FIG. 7, line 48 represents the output power of optical fiber amplifier 18 for an input power of constant –5 dbm, i.e. an input power that does not vary with varying wavelength.

Line 50 represents the respective effective noise figure characteristic for the output power of line 48. The effective noise figure NF of an EDFA is defined as $NF=1/G(N\_ASE/(h*v_{*\Delta v})+1)$; approximately equal to $N\_ASE/(G*h*v_{*\Delta v})$ if the gain G of the amplifier is $>>1$ (usually G>100 for EDFA); N_ASE corresponds to the spectral power density of amplified spontaneous emission noise; h is Planck's constant; v is the frequency, $\Delta v$ is the bandwidth considered for N_ASE.

For EDFA, the theoretical limit is NF=3 dB, but due to the input loss, non full spectral inversion and interstage losses of the amplifier, NF is approximately 5 dB.

The equivalent noise figure of a Raman amplifier is better than an EDFA-NF because of the different gain mechanisms, which is a distributed gain in the case of a Raman amplifier. The OSNR depends on the NF and varies with the input power of the amplifier as well as with the number of amplifiers. The OSNR can only decrease with the transmission distance. Improving the NF of the amplifier by 5 dB, e.g. by inserting a Raman preamplifier into the line, increases the OSNR by 5 dB. In transmission system where the spans, i.e. the distance between two amplifiers, are not identical, it may be expedient to utilise Raman amplifiers only for the longer spans when the input power of the amplifier is very low.

Line 52 represents the optical fiber amplifer 18 output for an additional flat Raman gain input of 9.3 dB. With such an additional input, the input for the optical fiber amplifier 18 is raised from –5 dBm to 4.3 dBm. As a result, the respective output 52 of the optical fiber amplifier 18 shows a huge tilt of approximately 8 dB. In other words: Transmission channels allocated to longer wavelengths will be supplied with much more power than channels allocated to shorter wavelengths. This is detrimental because a flat output characteristic is desired for further signal processing in the subsequent receiver 21.

Line 54 represents the respective effective noise figure characteristic. The absolute level of the effective noise figure characteristic 54 may still be satisfactory. In fact, since a lower noise figure is, in general, better than a higher noise figure, the average level of line 54 is better than the average level of line 50.

However, line 54 shows a falling characteristic, i.e. a characteristic that decreases with increasing wavelengths.

This characteristic is not desirable, since channels located in the lower part of the C-Band (1530 nm-side) suffer from higher fiber losses, from a smaller effective area of the fiber in this wavelength region, which emphasizes non-linear effects and, further, from Raman self scattering that transfers power from shorter wavelengths to longer wavelengths.

Accordingly, to compensate for these effects, a rising noise figure characteristic would be desirable.

The idea underlying the invention is to compensate for the huge tilt of the optical fiber amplifier 18 output (8 dB in FIG. 7) by forming and utilizing a Raman gain that has a wavelength dependent characteristic that is opposite to the respective tilt of optical fiber amplifier 18.

In the calculated example outlined above, the optical fiber amplifier 18 tilt is compensated with three Raman pumps 42, 44, 46, the wavelengths and powers of which are:

1423.5 nm; 25.5 dbm
1436.5 nm; 20.5 dbm
1441.1 nm; 15 dbm.

The Raman gain obtained with this values is represented by line 56 in FIG. 8. Obviously, the respective Raman gain is not flat but shows an appropriate tilt, as desired.

Line 58 represents the respective output power of the optical fiber amplifier 18 obtained with this appropriate Raman gain tilt and line 60 represents the respective characteristic of the noise figure.

As can be seen from FIG. 8, the output spectrum (line 58) is flat and the noise figure of the amplifier 18 (line 64) is, on average, improved by 3 dB in comparison with line 62 that represents the noise figure resulting from a flat input power of a non-Raman amplifier corresponding to line 48 in FIG. 7.

Further, the noise figure characteristic achieved with the appropriate Raman gain (line 64) shows the desired slope, i.e. a rising characteristic with increasing wavelengths.

Of course, less margin may be needed. FIG. 9 shows characteristics corresponding to those of FIG. 8, however, based on calculations for 5 dB of Raman gain. The wavelengths and powers of the pumps used to obtain the appropriate 5 dB of tilted Raman gain are:

1423.1 nm; 23.5 dBm
1436 nm; 20 dBm

The two calculations presented above apply to the C band but the same principle can be applied for any band location.

The invention claimed is:

1. An optical transmission system comprising at least one transmitter, at least one transmission line including at least one optical fiber amplifier, and at least one receiver communicably linked to the transmitter via the transmission line, the optical fiber amplifier being designed to show a flat characteristic of output power versus wavelength, wherein the optical fiber amplifier is designed to show the flat output characteristic in response to a flat characteristic of a first input power level versus wavelength, the transmission system further comprising at least one coupler and at least one Raman amplifier coupled to the transmission line via the coupler, the Raman amplifier comprising a plurality of Raman pumps and having a Raman gain that is tilted in a direction opposite to a tilt of the optical fiber amplifier that would occur in response to a flat characteristic of a second input power level versus wavelength such that the opposite tilt directions of the Raman amplifier and the optical fiber amplifier compensate each other and a noise figure characteristic achieved with the Raman gain rises with increasing wavelengths.

2. The system of claim 1, wherein the optical fiber amplifier is an Erbium Doped Fiber Amplifier.

3. The system of claim 1, wherein the coupler is a multiplexer.

4. The system of claim 1, wherein the coupler is a circulator.

5. The system of claim 4, wherein the circulator substitutes an isolator.

6. The system of claim 1, wherein the at least one Raman amplifier is added to the system leaving the remaining system unchanged.

7. The system of claim 1, wherein the Raman amplifier comprises three Raman pumps, wavelengths and powers of which being chosen to result in a predetermined gain tilt, and each of the Raman pumps emits a power with a spectrum having a maximum in wavelength range of 1400 nm to 1520 nm, each maximum referring to a different wavelength, the emitted power allocated to a spectrum with a maximum at a shorter wavelength exceeding the emitted power allocated to a spectrum with a maximum at a longer wavelength.

8. An optical transmission system comprising at least one transmitter, at least one transmission line including at least one optical fiber amplifier, and at least one receiver communicably linked to the transmitter via the transmission line, the optical fiber amplifier being designed to show a flat characteristic of output power versus wavelength, wherein the optical fiber amplifier is designed to show the flat output characteristic in response to a flat characteristic of a first input power level versus wavelength, the transmission system further comprising at least one coupler and at least one Raman amplifier coupled to the transmission line, the Raman amplifier having a Raman gain that is tilted in a direction opposite to a tilt of the optical fiber amplifier that would occur in response to a flat characteristic of a second input power level versus wavelength such that the opposite tilt directions of the Raman amplifier and the optical fiber amplifier compensate each other, wherein the Raman amplifier comprises three Raman pumps and each of the Raman pumps emits a power with a spectrum having a maximum in wavelength range of 1400 nm to 1520 nm, each maximum referring to a different wavelength, the emitted power allocated to a spectrum with a maximum at a shorter wavelength exceeding the emitted power allocated to a spectrum with a maximum at a longer wavelength.

9. A method of improving an optical signal to noise ratio in an optical transmission system comprising at least one transmitter, at least one transmission line including at least one optical fiber amplifier, and at least one receiver communicably linked to the transmitter via the transmission line, wherein the optical fiber amplifier exhibits a flat characteristic of output power versus wavelength, and the optical fiber amplifier exhibits the flat output characteristic in response to a flat characteristic of a first input power level versus wavelength, the method comprising coupling a Raman amplifier to the optical transmission system, the Raman amplifier having a Raman gain that is tilted in a direction opposite to a tilt of the optical fiber amplifier that would occur in response to a flat characteristic of a second input power level versus wavelength such that the opposite tilt directions of the Raman amplifier and the optical fiber amplifier compensate each other, the Raman amplifier comprising a plurality of Raman pumps which emit a power with a spectrum having a maximum in a wavelength range of 1400 nm to 1520 nm, each maximum referring to a different wavelength, the emitted power allocated to a spectrum with a maximum at a shorter wavelength exceeding the emitted power allocated to a spectrum with a maximum at a longer wavelength, and a noise figure characteristic achieved with the Raman gain rises with increasing wavelengths.

10. The system of claim 9, wherein the optical fiber amplifier is an Erbium Doped Fiber Amplifier.

11. The system of claim 9, wherein the coupler is a multiplexer.

12. The system of claim 9, wherein the coupler is a circulator.

13. The system of claim 12, wherein the circulator substitutes an isolator.

14. The system of claim 9, wherein the Raman amplifier is added to the system leaving the remaining system unchanged.

* * * * *